(12) United States Patent
Palomares et al.

(10) Patent No.: US 11,553,636 B1
(45) Date of Patent: Jan. 17, 2023

(54) SPACING-AWARE PLANT DETECTION MODEL FOR AGRICULTURAL TASK CONTROL

(71) Applicant: FarmWise Labs Inc., San Francisco, CA (US)

(72) Inventors: Thomas Palomares, San Francisco, CA (US); Michael Javault, San Mateo, CA (US); Matthew Condino, San Mateo, CA (US); Yu Nung Ma, San Francisco, CA (US)

(73) Assignee: FarmWise Labs Inc., San Francisco, CA (US)

( * ) Notice: Subject to any disclaimer, the term of this patent is extended or adjusted under 35 U.S.C. 154(b) by 0 days.

(21) Appl. No.: 17/845,972

(22) Filed: Jun. 21, 2022

(51) Int. Cl.
*A01B 79/00* (2006.01)
*G06T 1/00* (2006.01)
*G06V 10/764* (2022.01)
*G06V 20/10* (2022.01)

(52) U.S. Cl.
CPC .......... *A01B 79/005* (2013.01); *G06T 1/0014* (2013.01); *G06V 10/764* (2022.01); *G06V 20/188* (2022.01)

(58) Field of Classification Search
CPC .. A01B 79/005; G06T 1/0014; G06V 10/764; G06V 20/188
USPC .......................................................... 701/50
See application file for complete search history.

(56) References Cited

U.S. PATENT DOCUMENTS

| 5,442,552 | A | 8/1995 | Slaughter et al. | |
|---|---|---|---|---|
| 7,854,108 | B2 * | 12/2010 | Koselka | A01D 91/00 701/50 |
| 8,381,501 | B2 * | 2/2013 | Koselka | A01D 91/00 701/50 |
| 10,223,588 | B2 | 3/2019 | Wilson et al. | |
| 10,455,826 | B2 | 10/2019 | Palomares et al. | |
| 11,093,745 | B2 | 8/2021 | Redden et al. | |
| 2006/0213167 | A1 * | 9/2006 | Koselka | A01B 51/026 56/10.2 A |
| 2013/0204430 | A1 * | 8/2013 | Davey | G06F 30/13 700/216 |

(Continued)

FOREIGN PATENT DOCUMENTS

| CN | 109042607 | * | 12/2018 |
|---|---|---|---|
| EP | 3673458 | * | 7/2020 |

(Continued)

*Primary Examiner* — Muhammad Shafi
(74) *Attorney, Agent, or Firm* — Daylight Law, P.C.

(57) ABSTRACT

Methods and systems for controlling robotic actions for agricultural tasks are disclosed which use a spacing-aware plant detection model. A disclosed method, in which all steps are computer-implemented, includes receiving, using an imager moving along a crop row, at least one image of at least a portion of the crop row. The method also includes using the at least one image, a plant detection model, and an average inter-crop spacing for the crop row to generate an output from the plant detection model. The plant detection model is spacing aware in that the output of the plant detection model is altered or overridden based on the average inter-crop spacing. The method also includes outputting a control signal for the robotic action based on the output from the biased plant detection model. The method also includes conducting the robotic action for the agricultural task in response to the control signal.

16 Claims, 6 Drawing Sheets

(56) References Cited

U.S. PATENT DOCUMENTS

| | | | |
|---|---|---|---|
| 2016/0157414 A1 | 6/2016 | Ackerman et al. | |
| 2020/0337232 A1* | 10/2020 | Blank | ................ A01M 7/0089 |
| 2020/0337235 A1* | 10/2020 | Blank | ................ A01M 21/043 |
| 2021/0092891 A1 | 4/2021 | Grant et al. | |
| 2021/0127659 A1 | 5/2021 | Loukili et al. | |
| 2021/0289701 A1 | 9/2021 | White et al. | |

FOREIGN PATENT DOCUMENTS

| | | | |
|---|---|---|---|
| WO | WO-2006063314 | * | 6/2006 |
| WO | 2009153304 A1 | | 12/2009 |
| WO | WO-2109040866 | * | 2/2019 |

* cited by examiner

SPACING-AWARE PLANT DETECTION MODEL FOR AGRICULTURAL TASK CONTROL

BACKGROUND

Precision agriculture is a rapidly developing field of technology in which food production processes are optimized using automated agricultural farming operations that provide productivity gains and a better utilization of resources. Agricultural implements can automate agricultural tasks while navigating along rows of crops in an agricultural field, detecting plants as the implement navigates over these plants, characterizing plants as either target plants (i.e., desired crops) or non-target plants (e.g., weeds), manipulating actuators within the autonomous machine to selectively disturb non-target plants while leaving target plants substantially undisturbed, and monitoring the accuracy of the actuators during this weeding operation. Certain automated agricultural implements conduct their agricultural tasks using image data as an input. Such implements can include one or more cameras and machine vision systems to identify and locate plants such as crops or weeds. However, certain machine vision systems are subject to errors that can result in a reduced quality of execution for the associated agricultural tasks or even result in damage to crops.

SUMMARY

Systems and methods directed to precision agriculture are disclosed herein. Systems and methods involving spacing-aware plant detection models used for agricultural task control are disclosed herein. The agricultural task can be executed by a robot. The spacing-aware plant detection model can take in image data to detect plants for purposes of guiding and controlling the execution of the agricultural task by the robot. The agricultural task can include tasks required for seeding, weeding, fertilizing, watering, harvesting, pruning, culling, measuring, and otherwise managing agricultural crops.

As stated in the background above, certain machine vision systems used to control the execution of agricultural tasks are subject to errors that can result in a reduced quality of execution for the associated agricultural task or even result in damages to crops. For example, if a machine vision system controlling a weeding task either misses a weed or mischaracterizes the weed as a plant, the weed will be left alone to compete with and potentially harm nearby crops. Alternatively, if the machine vision system were to mischaracterize a crop as a weed, the crop could be accidentally killed thereby directly reducing the yield of the farm. Furthermore, errors are made more likely for machine vision systems in that weeds and crops can look alike in terms of their color and shape. Also, the appearance of weeds and crops can change dramatically over the course of their growth and weeds of all growth phases need to be distinguished from crops of all growth phases.

Specific embodiments of the invention disclosed herein include the use of a spacing-aware plant detection model. Such a model can use an average inter-crop spacing for a crop row to improve the performance of the plant detection model. The average inter-crop spacing can be used by the plant detection model in various ways as is described in the detailed description below. For example, in specific embodiments, the average inter-crop spacing is used in that it biases the plant detection model such that the model "expects" crops to appear in a certain zone of the crop row and thereby decrease the certainty of classification or identification of weeds within that certain zone.

Specific embodiments of the invention disclosed herein obtain the average inter-crop spacing for a crop row in various ways as are described in the detailed description below. For example, the average inter-crop spacing can be provided to the system using a user interface. As another example, the plant detection model which will use the inter-crop spacing can also be used to determine the inter-crop spacing. As the plant detection model is capable of detecting crops it is also capable of detecting two adjacent crops and contributing to the measurement of the spacing between them. Multiple such measurements can then be used to measure an average inter-crop spacing which can be used by the plant detection model. As another example, both approaches can be used in combination such that each produces a value that can be used to cross check the value from the other approach.

In specific embodiments of the invention, the output of the plant detection model is used to control an agricultural task in various ways as described in the detailed description below. For example, the output can be used to generate a control signal for an agricultural task. The control signal could be a control signal for a weeding task where the control signal includes an input for the location of the weed in a frame of reference. The output of the plant detection model could be a classification of a plant in an image as a weed, and the control signal could use the output of the plant detection model in that a plant location known to the system and associated with the image could be identified as the plant location for the weed. As another example, the output of the plant detection model could itself include the location of the weed, and such an output could be used to generate a control signal for weeding in that the location is provided to the weeding system as part of the control-signal for execution.

In specific embodiments of the invention, a method for controlling a robotic action for an agricultural task, in which all steps are computer-implemented, is provided. The method comprises: receiving, using an imager moving along a crop row, at least one image of at least a portion of the crop row; using the at least one image, a plant detection model, and an average inter-crop spacing for the crop row to generate an output from the plant detection model; outputting a control signal for the robotic action based on the output from the biased plant detection model; and conducting the robotic action for the agricultural task in response to the control signal.

In specific embodiments of the invention, a system for controlling a robotic action for an agricultural task is provided. The system comprises an imager, one or more processors, and one or more computer-readable media storing instructions that, when executed by the one or more processors, cause the system to: move the vehicle along the crop row; receive, using the imager moving along a crop row, at least one image of at least a portion of the crop row; using the at least one image, a plant detection model, and an average inter-crop spacing for the crop row to generate an output from the plant detection model; outputting a control signal for the robotic action based on the output from the biased plant detection model; and conducting the robotic action for the agricultural task in response to the control signal.

In specific embodiments of the invention, one or more non-transitory computer-readable media storing instructions are provided. The instructions, when executed by one or more processors, cause a system to execute a method for controlling a robotic action for an agricultural task, comprising: receiving, using an imager moving along a crop row, at least one image of at least a portion of the crop row; using the at least one image, a plant detection model, and an average inter-crop spacing for the crop row to generate an output from the plant detection model; outputting a control signal for the robotic action based on the output from the biased plant detection model; and conducting the robotic action for the agricultural task in response to the control signal.

DETAILED DESCRIPTION

Methods and systems related to precision agriculture are disclosed in detail herein. The methods and systems disclosed in this section are nonlimiting embodiments of the invention, are provided for explanatory purposes only, and should not be used to constrict the full scope of the invention. Although the specific examples provided in this section are directed to an agricultural implement for weeding the intra-row spacing area of a crop row, specific embodiments disclosed herein are broadly applicable to any form of agricultural implement conducting any form of agricultural task as guided by a spacing-aware plant detection model.

Figure 1:
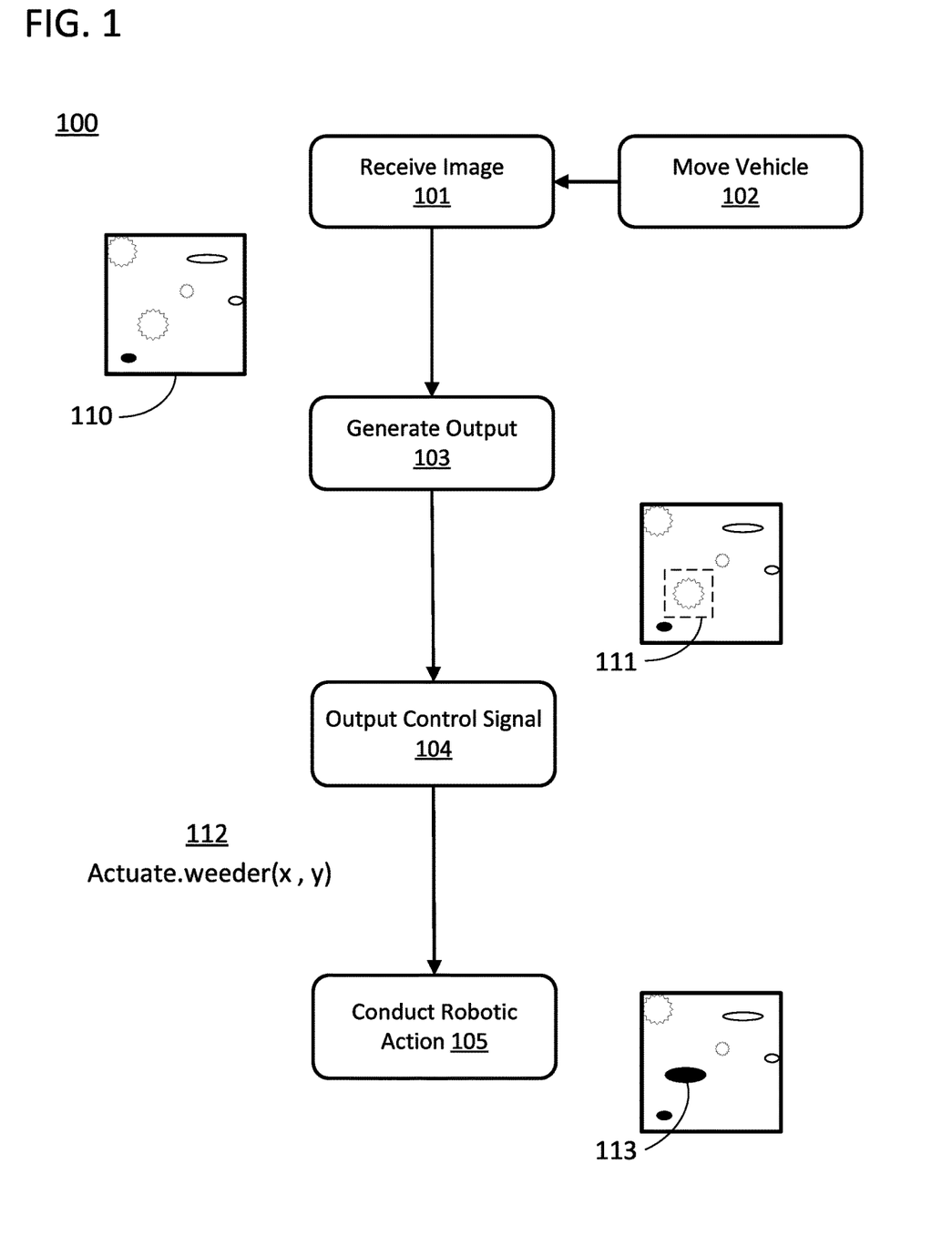
FIG. 1 Illustrates a flow chart for a set of methods in accordance with specific embodiments of the invention disclosed herein.

FIG. 1 illustrates a flow chart 100 for a set of methods in accordance with specific embodiments of the invention disclosed herein. Each of the steps in the method are computer implemented and can be conducted by a system such as the systems illustrated in FIG. 2. The set of methods in flow chart 100 are methods for controlling a robotic action for an agricultural task. The agricultural task can include tasks required for seeding, weeding, fertilizing, watering, harvesting, pruning, culling, measuring, and otherwise managing agricultural crops. The robotic action can be any action required to conduct these tasks. As used in this disclosure, the term robot action is being used in its broadest sense to encompass any machine implemented action conducted in response to a control input where the machine implemented action either collects information from the physical world or has an impact on the physical world. For example, the capturing of an image in response to a digital command to do so is a robotic action as that term is used in this disclosure as well as the actuation of a physical blade for disrupting the soil around a weed or the directed application of thermal energy to the meristem of a weed. As such, the robotic actions conducted in accordance with this disclosure include robotic precision harvesting of crops in a crop row, robotic precision weeding of an intercrop area of a crop row, robotic precision watering on a crop row, robotic precision thermal treatment of the intercrop area of a crop row (e.g., the disruptive bombardment of weeds with high intensity laser light), robotic precision chemical application on a crop row (e.g., pesticide application to weeds or fertilizer application to crops), and other robotic actions.

Figure 2:
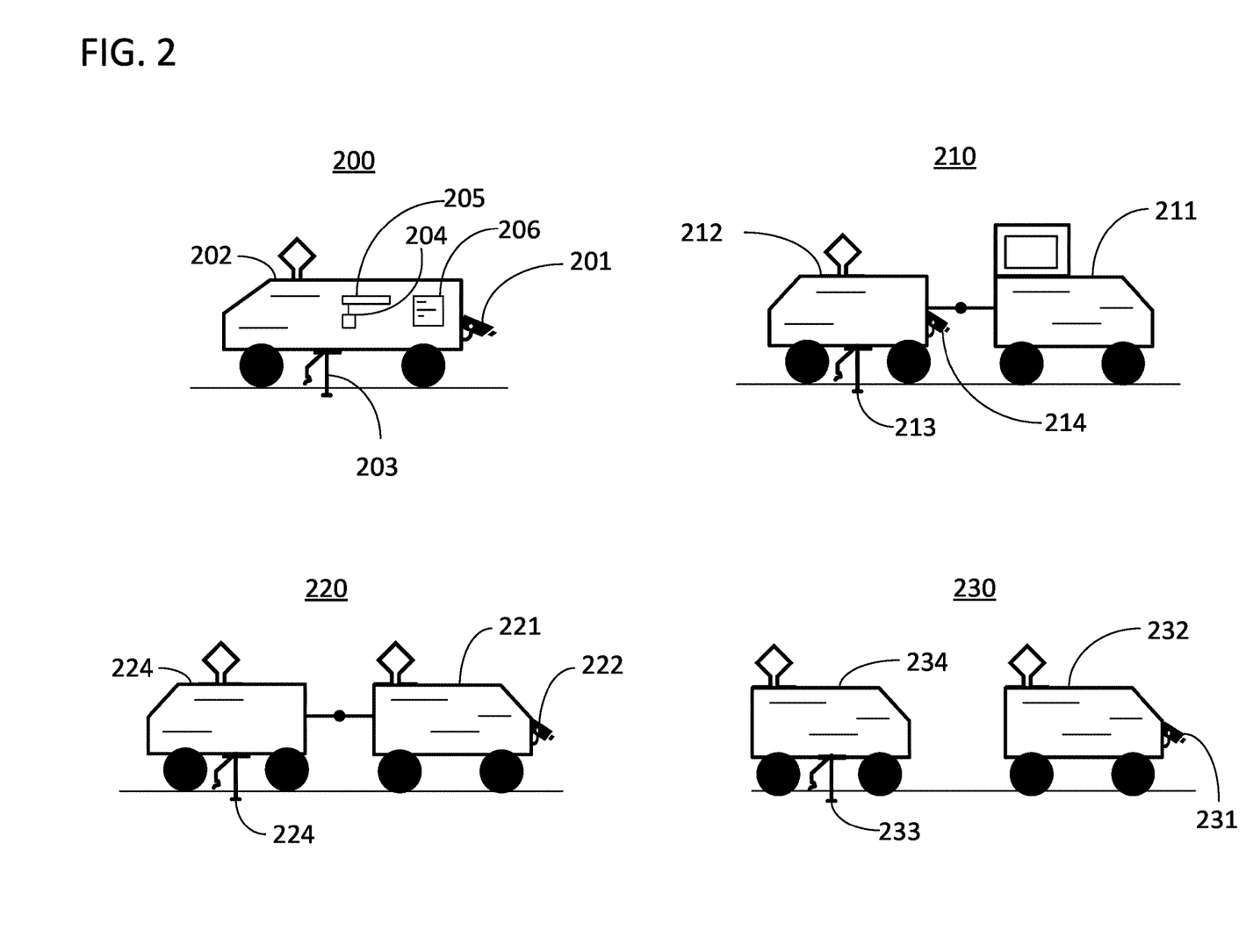
FIG. 2 illustrates a set of block diagrams of various systems for controlling a robotic action for an agricultural task in accordance with specific embodiments of the invention disclosed herein.

The methods of flow chart 100 can be conducted by various systems. FIG. 2 illustrates a set of block diagrams of various systems for controlling a robotic action for an agricultural task in accordance with specific embodiments of the invention disclosed herein. The systems can include an imager such as imager 201, one or more processors such as processor 204 and one or more computer-readable media such as computer-readable media 205. The processor could be a microprocessor or microcontroller and the computer-readable media could be onboard memory or an external memory in various forms such as dynamic random-access memory or electrically programmable read only memory. The one or more computer-readable media can store instructions that, when executed by the one or more processors, cause the system to execute a method in accordance with the methods of flow chart 100. The systems can also include a vehicle such as vehicle 202 and an agricultural implement such as implement 203. The vehicle could be a tractor augmented to include an imager and an agricultural implement for precision agricultural tasks, or a dedicated vehicle that has been designed specifically to implement the methods disclosed herein. In specific embodiments of the invention, the system can include a vehicle such as vehicle 211 in diagram 210 and a separate towed vehicle with an agricultural implement 213 and an imager 214. For example, the vehicle 211 could be a tractor and vehicle 212 could be a dedicated towed vehicle that has been designed specifically to conduct the robotic actions disclosed herein.

The imager of the system can take on various forms in different embodiments depending upon what type of image is required and various other factors. The imager can be directed down at the ground to limit parallax errors. The imager can capture light in the visible spectrum or any other spectrum including infrared, short wave infrared, ultraviolet, or any other spectrum. The imager can also include multiple physical capture locations to produce stereoscopic images or instantaneous panoramic images. The imager can also be a passive sensor or an active sensor which illuminates a target with light of a specific spectrum and captures the reflected light. Other alternative imagers are described below with reference to the particular image data required for a given embodiment.

The systems disclosed herein can include additional sensors in addition to an imager which are used to collect additional information to assist in controlling the robotic action of the system, or for controlling a vehicle that is contributing to the movement of the imager. For example, the system can include additional imagers directed outwardly from the vehicle, as opposed to down at the ground, such as color cameras, LIDAR sensors, and or structured light cameras. These additional sensors could detect nearby obstacles, localize the vehicle within a scene, contextualize a nearby scene, etc. The sensors could also include sensors to monitor the location of the imager such as a real time distance sensor (e.g., a ground feeler wheel or electrical distance sensor) calibrated to detect the height of the imager of the ground. Similar sensors could also be used to modify the robotic action conducted by the system. These sensors could also include sensors to detect the three-dimensional position of the imager with respect to a frame of reference of a vehicle or with respect to another frame of reference such as a ground-based frame of reference. The sensors could include odometry sensors, imagers for simultaneous localization and mapping, or telemetry sensors. Data from one or more such sensors, and possibly control information used to alter a pose of the imager, could be used to determine a three-dimensional position of the imager. Data from such sensors could also be used to determine a three-dimensional position of an agricultural implement. The sensors could also include sensors to help navigate a vehicle, modify or otherwise affect the robotic action that will be conducted by the system, or assist in the operation of the plant detection model and imager. These sensors could also include odometry sensors, gravimetric sensors, magnetometers, gyroscopes, inertial movement units, temperature sensors, pressure sensors, water sensors, and various other sensors.

Flow chart 100 begins with a step 101 of receiving, using an imager moving along a crop row, at least one image of at least a portion of the crop row. The image can be an axonometric or direct top down view of at least a portion of the crop row such as image 110. The step can be conducted by one or more processors executing instructions stored in one or more computer-readable media. The image can be taken from a top-down view while the imager is either directly above the portion of the crop row or at an angle from the crop row. The image can include plants in the crop row and can include the spacing between the crops in the inter-crop area of the row and can also include the inter-row area on either side of the row. The image can be part of a series of images. In specific embodiments of the invention, and as will be described below, a specific plant can be tracked across multiple images to obtain a better estimate of the location of the plant. The step can also involve capturing sensor data along with the image (e.g., in real time) such as any of the sensor data mentioned above. The step can also be preceded or conducted simultaneously with a calibration of the height of the imager off the ground such (e.g., prior to operation or in real time as the height of the imager is mechanically adjusted relative to the ground during operation by a mechanical servo loop).

The imager can be moving along the crop row in various ways. In particular, the imager can be connected to or towed by a vehicle moving along the crop row. The vehicle can be autonomously guided down the crop row, driven by an onboard human operator, or guided by a remote human operator. In specific embodiments, the vehicle may autonomously move down the crop row, but be manually turned at the end of the crop row to line it up with the next row it will traverse. In alternative embodiments, the vehicle may both autonomously move down the crop row, and autonomously turn itself at the end of the crop row.

The methods of flow chart 100 can include a step 102 of moving the vehicle along the crop row. The step can be conducted by an autonomous vehicle or be conducted manually. The step can include receiving or measuring imager location data when the vehicle moves along the crop row. The imager is positioned to be moved along the crop row by the vehicle. The imager can be directly attached to the vehicle or towed by the vehicle. Additionally, the vehicle can include an agricultural implement which will be used in an agricultural task or the agricultural implement can be towed by the vehicle. The agricultural implement can conduct the robotic action for the system. At least one of the agricultural implement and the imager can be directly connected to the vehicle. At least one of the agricultural implement and the imager can be towed by the vehicle. The pose of the imager can be registered in a frame of reference. The control signal for the robotic action can be provided in the same frame of reference. For example, the position of a plant as detected by the imager in a first coordinate system can be provided in the form of a control signal in that coordinate system to guide the agricultural implement to the plant. The imager and agricultural implement can be registered in the same frame of reference owing to ex ante knowledge of the structure of the vehicle to which the implement and imager are connected, or to the manner in which the imager or agricultural implement are being towed by the vehicle to which the other component is connected. The imager and agricultural implement can further be registered in the same frame of reference by using sensors that provide information as to the location or orientation of both elements with respect to that frame of reference. In alternative embodiments, the agricultural implement and imager can be moved using entirely separate vehicles but can still be registered to the same frame of reference using sensor data to localize the separate vehicles, or the imager and agricultural implement individually, with respect to a common frame of reference such as a ground or Earth-based frame of reference.

FIG. 2 illustrates various ways in which the imager can be moved along a crop row. The imager can be an imager 201 located on and attached to a vehicle 202 moving along the crop row as in diagram 200. Vehicle 202 can also include an agricultural implement 203 to conduct the robotic action. As the characteristics of the vehicle 202 are known, locating a plant with respect to imager 201 provides a location of the plant which is actionable by agricultural implement 203 because the relative locations of the plant and the implement are thereby both registered in a frame of reference of the vehicle. The imager can alternatively be an imager 214 connected to a towed vehicle 212 being towed by another vehicle 211. The towed vehicle can include an agricultural implement 213 that is registered in the same frame of reference as imager 214 as both the imager and agricultural implement are connected to the same vehicle. The imager can alternatively, as in diagram 220, be an imager 222 connected to a vehicle 221 which is towing a towed vehicle 223 which includes an agricultural implement 224. In these embodiments, the imager 222 and implement 224 may be registered owing to the structural aspects of the vehicle 221 and towed vehicle 223. Alternatively, the imager can be, as in diagram 230, an imager 231 attached to a first vehicle 232 while an agricultural implement 233 for conducting the robotic action is connected to a second vehicle 234. The first and second vehicles can both be similar land-based vehicles, or the first vehicle can be an air-based drone or alternative vehicle while the second vehicle is a land-based vehicle with the agricultural implement. In alternative embodiments any of the vehicles can be any type of land or air-based vehicles including wheeled, legged, tracked, fixed wing, rotary flight vehicles such as quadcopters, and others.

Figure 3:
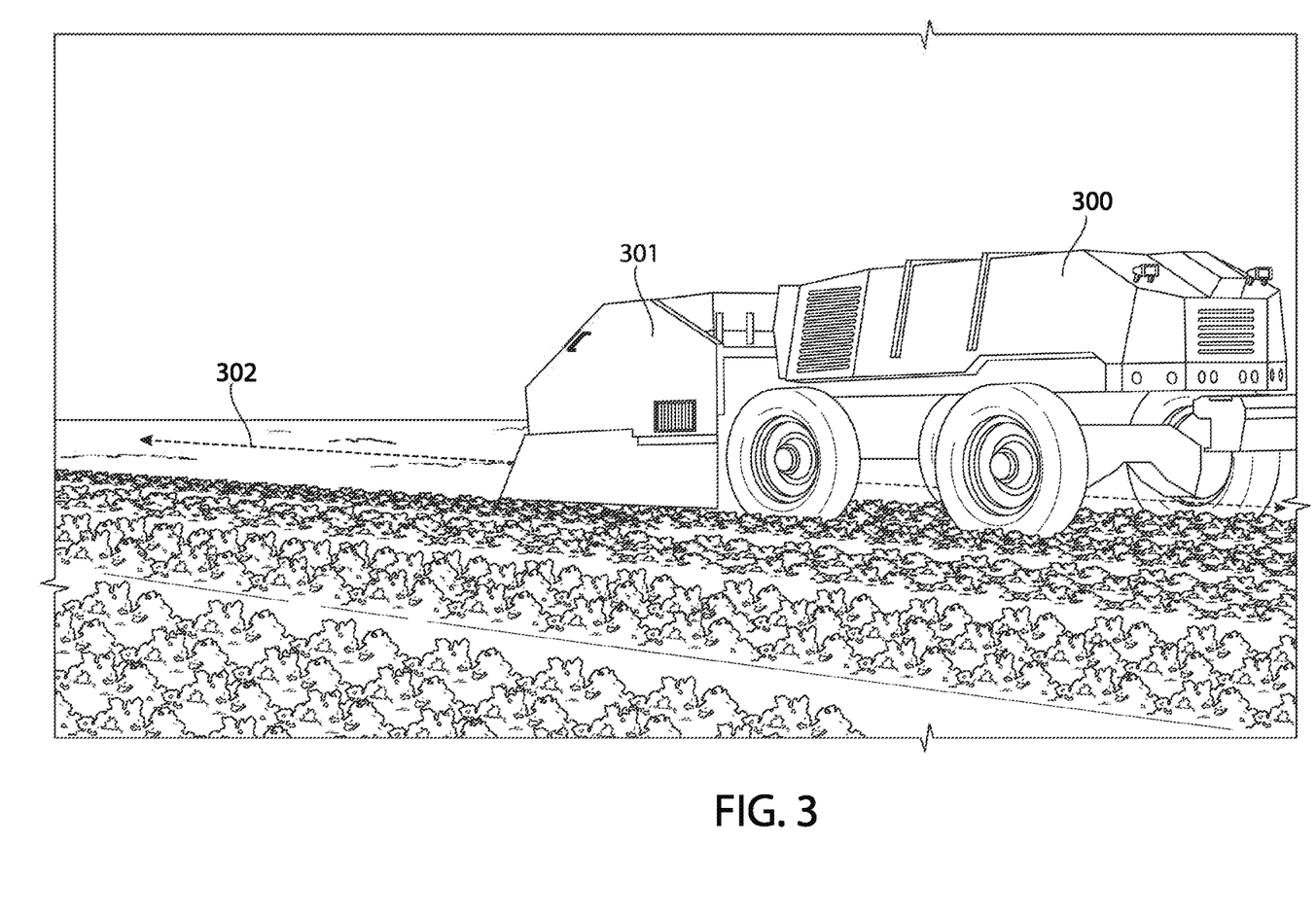
FIG. 3 illustrates a vehicle towing a towed vehicle with an agricultural implement in accordance with specific embodiments of the invention disclosed herein.
Figure 4:
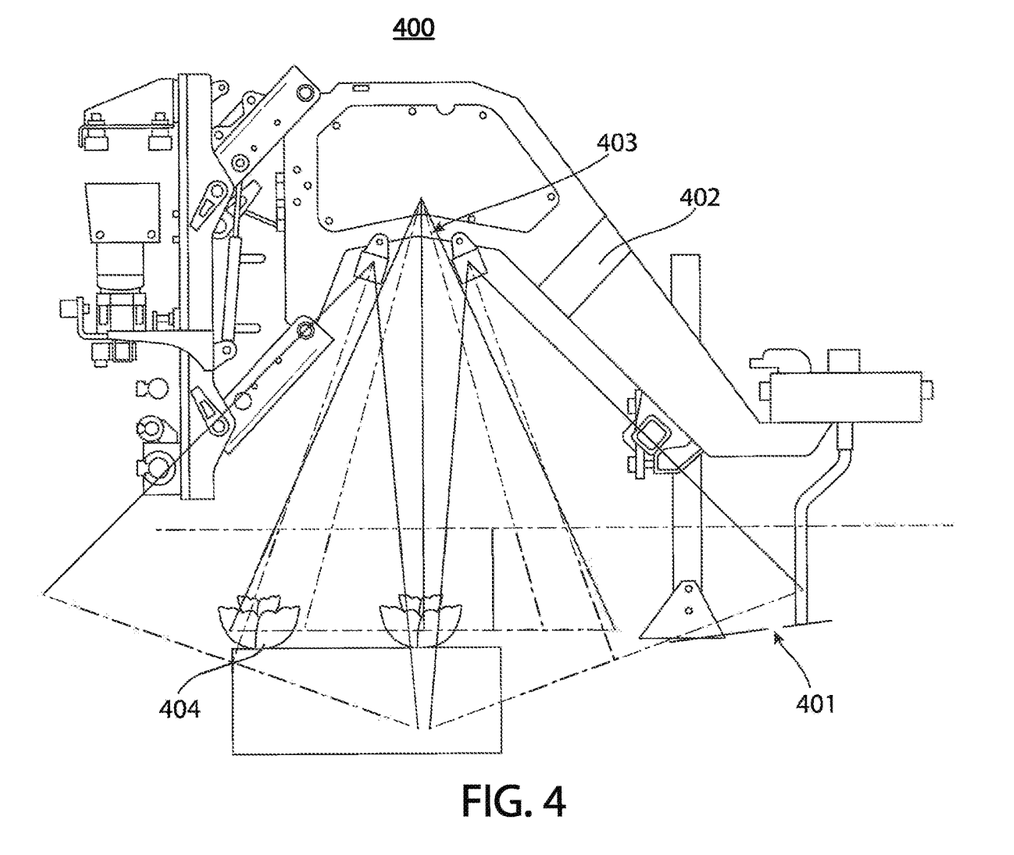
FIG. 4 illustrates a schematic of an imager location relative to an agricultural implement in accordance with specific embodiments of the invention disclosed herein.

FIG. 3 is an illustration of an example system in which the methods disclosed herein can be practiced. As illustrated, a vehicle 300, in the form of an autonomous tractor, is towing a towed vehicle 301, in the form of a dedicated precision weeding tool, along a crop row 302. In the illustrated embodiment, the vehicle 300 includes its own sensors and processors for autonomously moving down the crop row while towed vehicle 301 includes an imager and processors for detecting a plant and controlling the robotic action of the systems disclosed herein. The towed vehicle 301 can include multiple agricultural implements arranged in a row such as is shown in schematic 400 in FIG. 4. Schematic 400 includes an agricultural implement in the form of automated weeding blades 401 attached to an arm 402. One portion of the weeding blade can be used for cultivating and disrupt soil outside of the crop row while a second portion is outside of the crop row in a first state but can be actuated to disrupt the soil in the inter-crop space of the crop row in a second state. An imager 403 is also attached to arm 402 and is thereby registered relative to weeding blades 401. In this specific embodiment and application, the frame of reference and/or registration of the imager and agricultural implement do not require an accurate measurement of the relative "z" coordinate (height) of the plant off the ground as the weeding blades 401 will disrupt the soil well below ground level to adequately terminate a weed. Indeed, in specific embodiments, the control signal for controlling the agricultural task may only be provided with reference to "x" (vehicle direction of travel along crop rows) and "y" (perpendicular to "x" and "z") coordinates as to the location of the plants because the agricultural implement control system is able to intuit that the robotic action is to be conducted at ground level. In accordance with these embodiments, imager 403 will be moved along the crop row ("x" axis) and detect plants such as plant 404. The system will then be able to actuate weeding blades 401 in such a way that weeds in the crop row of plant 404 are terminated while the crops are kept safe. In alternative embodiments, the control system will also need the "z" coordinate to be determined by the plant detection model and control system such as in the case of precision picking.

In specific embodiments of the invention, the image obtained by the imager can take on various forms. The image can be a single image taken in isolation or an image taken in relation to a series of images. The image can be a single capture from the imager or an amalgamation of several captures either from different angles or using different spectra. The imager can be fixed or movable. In specific embodiments, the image is taken to capture a top-down view of the plant in order to best determine a location of the meristem of the plant. The image can be encoded in a set of pixel values or a set of voxel values depending on whether the image is a two-dimensional image or three-dimensional image. The image can be a stereoscopic image, a multispectral image, a color filtered visual spectrum image, a color filtered hyperspectral image, or a normalized difference vegetation index image. The image values captured by the imager can undergo various forms of preprocessing to produce the appropriate values for the image.

Flow chart 100 continues with a step 103 of using at least one image, a plant detection model, and an average inter-crop spacing for a crop row to generate an output from the plant detection model. The image can be the image received in step 101 as described above. The crop row can be the crop row in the image. The plant detection model can take on various forms depending upon the embodiment to which it will be applied. The plant detection model could include a machine learning model. The machine learning model could be a trained classifier used to identify and classify subjects in input image data. The plant detection model could include a support vector machine (SVM). The plant detection model could include an artificial neural network (ANN). The plant detection model could include a convolutional neural network (CNN). The ANN could be a region-based convolutional neural network (RCNN). The plant detection model could include encoder and decoder layers. The plant detection model could include a long short-term memory (LSTM) network used to predict the next location of a plant given the past "n" detected locations of the plant as the plant is tracked from one frame to the next. The plant detection model could include preprocessors or feature detectors and a main model portion. For example, the plant detection model could include a color filter preprocessor. The plant detection model could also be a hard coded traditional classifier designed to identify and classify subjects in input image data using factors such as shape, color, edges, and other factors used to identify or classify subjects in image data. The model could use traditional computer vision techniques for this purpose including an analysis of color histograms of the input images or edge detections on the input images using empiric rules to distinguish the different classes.

The input to the plant detection model can take on various forms in different embodiments of the invention. The input to the plant detection model could include the image or derivatives thereof such that the image is used with the plant detection model to generate an output of the plant detection model. The input to the plant detection model could be a single image or a chronological sequence of images. For example, an ANN of the plant detection model could be designed to take in an input having the size of the number of pixels or voxels in the image, or an input having the size of the number of pixels or voxels times "n" where "n" is equal to the number of images in a chronological sequence. As another example, an ANN of the plant detection model could be designed to take in an input having the size of the number of pixels or voxels times "n" where "n" was the number of individual values used to encode each pixel of voxel in the image (e.g., three values for a red green blue (RGB) encoding). In keeping with this example, if the image where a hyperspectral image, the plant detection model could be designed to take in an input having the size of the number of values required to encode each pixel or voxel of each spectra times the number of spectra in the image.

In specific embodiments of the invention, the input to the plant detection model can also include additional metadata concerning the input or sensor data obtained using other sensors on the vehicle. For example, the input could include a time of day at which the image was taken, a measurement from an ambient light sensors, a speed of movement of the imager, a height off the ground at which the image was taken as measured by a mechanical or electronic distance sensor, and various other sensor or metadata. The sensor data could be sensor data taken in real time as the images are captured. The height off the ground of the imager could be measured by a mechanical feeler wheel or electrical distance sensor. The input could also include a pose of the imager or three-dimensional position of the imager or an agricultural implement in three-dimensional space if the system was able to capture such information.

The input to the plant detection model can also undergo preprocessing before it is delivered to an ANN, or other machine intelligence system, of the plant detection model. For example, an image or series of images from a single imager or multiple imagers could be applied to a feature detection algorithm or any time-based image comparison method to compute ground movement to serve as an additional input to the plant detection model. The other time-based image comparison methods could include visual odometry methods. In embodiments in which multiple images from multiple imagers or multiple sources of sensor data in addition to image data are provided as inputs to the plant detection model, the plant detection model could include preprocessing in the form of a weight-based merge operation of the various images and/or sensor data based on the measured or perceived accuracy of each source. Such embodiments could alternatively or in combination use an outlier detection filter to select an imager or source of sensor data to serve as the most trusted source or to select one or more imagers or sources of sensor data to have their data fully discredited.

The output of the plant detection model can take on various forms depending upon the associated embodiments in which it is generated. The output could include an identification of a plant as a crop, specific type of crop, weed, or specific type of weed. For example, the output could classify plants as either crops or weeds and could additionally or in the alternative identify plants as specific types of crops. The plant detection model could only provide outputs with respect to one kind of plant (e.g., only provide locations for weeds or only provide locations for crops). Alternatively, the plant detection model could provide outputs for all detected plants (e.g., provide an identification of the plant as belonging to a specific class). The output could also include a location of the plant in the image or in a given frame of reference (e.g., in a frame of reference in which the imager is registered). The location of the plant could include an area, such as a bounding box or a contour of the plant, or a specific point such as the point at which the meristem of the plant went through the ground. For example, the output could be a bounding box such as bounding box 111 directed to a set of pixels on image 110. The location could be provided with respect to various portions of the plant such as the plant's full physical extent or a specific location such as a location of the meristem of the plant. The location could be provided with respect to the pixels of the image or with respect to a frame of reference such as a crop row based, field based, or Earth-based frame of reference. The output could also include multiple ones of the outputs described above. For example, the output could include an area output in the form of a contour of the plant as well as a location output in the form of a location of the meristem of the plant.

In specific embodiments of the invention, the output could include a confidence index for the various outputs of the plant detection model. The output could also include multiple outputs with different confidences indexes assigned to each (e.g., a certain output associated with an average center of the crop given the visible extent of the plant, and a less certain output associated with a location of the meristem). The confidence index output could include probabilities regarding the uncertainty of the plant detection model with respect to each output. For example, if the plant detection model was designed to output classifications, the classification could include a percentage level of certainty associated with the prediction (e.g., 88% certainty that the plant is a crop).

In specific embodiments of the invention, the output could also include size information regarding the plant such as a bounding box or other perimeter, a height of the plant, a volume of the plant, or an expected depth of the roots of the plant. The output could include a projected location of the meristem onto the ground. The size information could be used to control the agricultural task such as by assuring that a precision weeder does not disrupt soil within the vicinity of a crop's roots.

In specific embodiments of the invention, the output of the plant detection model can include frame-to-frame plant tracking. The plant detection model can, in specific embodiments, identify distinct plants and track them from frame to frame as the imager moves with respect to the plant. The term "frame" in this sense refers to an individual image taken in a chronological series of images. In these embodiments, the overall system not only recognizes a plant as a plant generally, but also identifies the plant as a specific unique entity. The plant can be given an identifier in memory when it is first identified by the plant detection model, and the identifier can then be used to tag the plant when it is recognized in a subsequent image captured by the frame. The tracking of an individual plant from image to image can then assist in the generation of a more accurate prediction of the location of the plant as the output of the plant detection model in each of the frames with respect to that individual plant can be intelligently combined to produce a more accurate result. For example, the location of the plant in each of the images can be averaged to produce a result that may decrease the effect of deviations associated with predicting the location based on the individual images. As another example, in embodiments in which a confidence index is produced for the location value, the confidence index can be used to weight the average such that measurements with a higher confidence are given more weight in the calculated average location. Various other methods for intelligently combining the multiple measurements can be utilized in these embodiments. The identification and tracking of individual plants can also be helpful for measuring the average inter-crop spacing along the crop row and for measuring the speed or location of the vehicle as is described elsewhere herein.

The average inter-crop spacing for a crop row can be used to generate an output from the plant detection model in various ways. Generally, the average inter-crop spacing can be used to bias the plant detection model such that the model effectively has some understanding that a plant appearing at the inter-crop spacing distance from the last identified crop is likely to be a crop, and a plant appearing at less than that distance is likely to be a weed, with an increased likelihood that the plant is a weed towards one half the inter-crop spacing distance from the last identified crop. How this concept is implemented technically varies depending upon the characteristics of the plant detection model, the characteristics of the imager and any associated sensors being used to detect plants, and various other characteristics of the system. In specific embodiments of the invention, the average inter-crop spacing is used to bias the plant detection model to increase its accuracy and performance.

Figure 5:
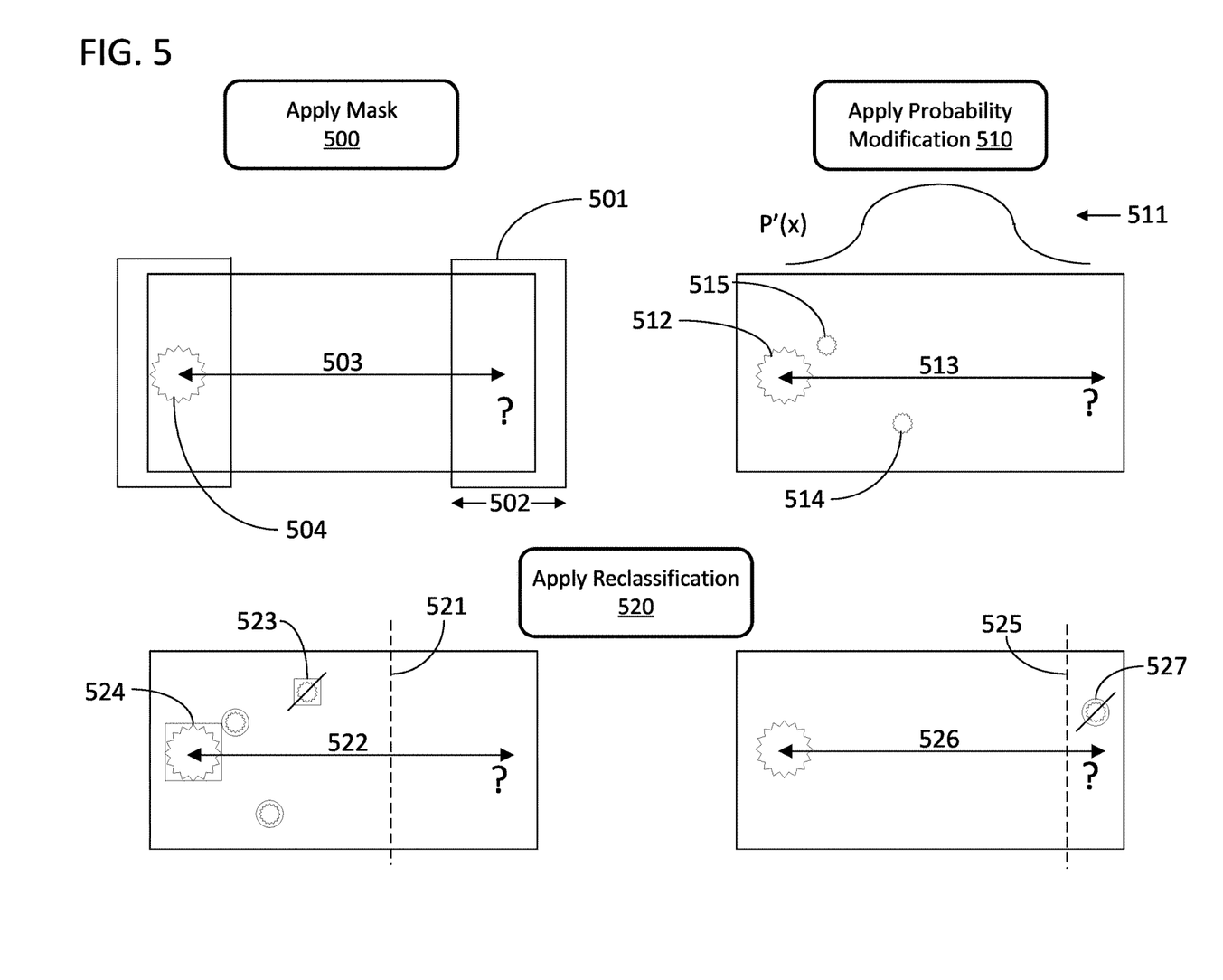
FIG. 5 illustrates a set of diagrams for how a plant detection model can use an average inter-crop spacing of a crop row in accordance with specific embodiments of the invention disclosed herein.

FIG. 5 includes a set of flow chart steps and associated block diagrams to explain how the average inter-crop spacing can be used to generate an output from the plant detection model. Each of the flow chart steps in FIG. 5 can be conducted as part of step 103 in FIG. 1. The steps can be conducted in separate embodiments or in combination in the same embodiments. The steps show examples of how the inter-crop spacing can be used to bias the plant detection model. In alternative embodiments, described below, other factors can be used to bias the plant detection model in the alternative or in combination.

Flow chart step 500 includes applying a mask 501 in an expected crop location 502. In the illustration, the expected crop location 502 is derived from an average inter-crop spacing 503 for the row. The inter-crop spacing refers to a distance between successive crops within a same row, along the "x" axis. This is not to be confused with the inter-row spacing, the distance between rows, along the "y" axis. In the illustrated embodiments, the system has already identified plant 504 from a prior step and has already determined average inter-crop spacing 503 using methods, such as those described below with reference to FIG. 6, such that the area for mask 501 can be derived therefrom. The width of the expected crop location 502 can be set based on the type of crop in the row, the expected or actual performance of the plant detection model, and a level of confidence in the measurement average inter-crop spacing. For example, if there was less confidence in the average inter-crop spacing owing to the type of planting used to plant the crops, to the fact that not enough inter-crop spacings from the crop row had yet been measured, or to detected variations in the actual measured inter-crop spacings, then the mask 501 could be made larger.

Mask 501 can be used to bias the plant detection model in various ways. The mask 501 can be a mask used to bias the plant detection model and prevent the detection of weeds within the expected crop location 502. For example, if the plant detection model were to determine that a plant found in expected crop location 502 were a weed, the average inter-crop spacing could be used (via the mask 501) to override that characterization and either null the output for the rest of the system or recharacterize the plant as a crop. As another example, if the plant detection model were designed only to identify weeds, portions of the image which were masked by mask 501 could be blocked out to prevent the detection of any plants in expected crop location 502. In a related approach, mask 501 could be used to prevent any image data associated with expected crop location 502 from being processed at all by the plant detection model in expected crop location 502.

Flow chart step 510 includes applying a classification probability modification function 511 to the output of the plant detection model. The classification probability modification function 511 can be derived from the average inter-crop spacing 513 for the crop row. The classification probability modification function can have a distribution along the inter-crop spacing and can have different impacts on the output in accordance with that distribution. The distribution and impacts can take on various forms in different embodiments.

In specific embodiments of the invention, the impact of the probability modification function can be applied to the output of the plant detection model using a direct mathematical operation. For example, a numerical confidence index associated with plant 515 being a weed could be multiplied by a corresponding value of probability modification function 511. As another example, the output of the plant detection model and a value of the probability modification function could be added, multiplied, or applied to a more complex mathematical operation. The classification probability modification function could boost probabilities of a given classification by adding percentages to a confidence index or by multiplying a confidence index by a value greater than one. The classification probability modification function could decrease probabilities of a given classification by subtracting percentages from a confidence index or by multiplying a confidence index by a number less than one.

The probability modification function distribution can take on various characteristics. For example, the classification probability modification function can be a set of values from zero to one on the y-axis with the x-axis value being a distance along the crop row. As illustrated, the classification probability function 511 is a gaussian distribution with a maximum value towards the center of the average inter-crop spacing 513 from plant 512. As such, classification probabilities for weeds in the vicinity of weed 514 will have their probabilities boosted as compared to weeds in the vicinity of weed 515. The probability modification function can take on various characteristics in terms of the relationship of the y-axis to the x-axis. The curve does not need to be Gaussian as many other distributions can be applied such as a saw tooth or Mandelbrot distribution. The probability modification function can also be nonlinear such that different modifications are applied per different zones in a discontinuous fashion (e.g., boost by a factor of 2 in a middle zone and reduce by a factor of 2 in a zone centered around the end of average inter-crop spacing 513). The values can also be inverted with probability boosting towards the ends and probability reduction towards the center if the classification is for plants as compared to weeds. Multiple probability modification functions can be applied to multiple outputs of the plant detection model in this fashion.

Flow chart step 520 includes adding a reclassification function to a classifier of the plant detection model. The reclassification function can be derived from the average inter-crop spacing for the crop row. The reclassification function can take on various characteristics in different embodiments which can be used in combination or in the alternative. In general, the reclassification function will alter the classification of a plant as output by the plant detection model based on the average inter-crop spacing for the crop row. For example, if a plant detection model identified a plant as a crop well before a crop would have been expected, the classification of the plant could be reclassified to a weed. Alternatively, if a plant detection model identified a plant as a weed in close proximity to where a crop would have been expected, the classification of the plant could be reclassified as a crop.

As with the alternative approaches described above, the reclassification function can have different distributions and impacts depending upon the application. For example, the reclassification function could exhibit variant characteristics along the average intercrop spacing such as including different zones or exhibiting a curved functional relationship. The zones or curve can determine how likely it will be that the reclassification will be applied. The likelihood can be a binary black or white reclassification in some zones and be a conditional reclassification in others such as by being based on the probability index for a classification as output by the plant detection model. The strength of the reclassification function and which classifications are reversed can vary based on the objectives of the system. For example, a weed could automatically be reclassified as a crop if a distance from the nearest crop is within a safety threshold for protecting the crop from the weeder. As another example, a crop could be automatically reclassified as a weed if it were within a culling threshold for the crop row.

In the illustrated examples, a threshold 521 has been set based on average inter-crop spacing 522 to reclassify a crop classification 523 into a weed classification based on the fact there is a low likelihood that a crop would have been located closer than threshold 521. In the illustration, circles represent weed classifications and squares represent crop classifications. In specific embodiments, threshold 521 can be a culling threshold which attempts to protect crop 524 from any competitive plant growth even if it is another crop instead of a weed. Furthermore, a threshold 525 can be set based on average intercrop spacing 526 to reclassify a weed 527 as a crop based on the high likelihood that a crop would be located beyond threshold 525.

In specific embodiments of the invention, the average inter-crop spacing can be used in various ways based on the objectives of the system, the accuracy of the plant detection model, the confidence in the measurement of the inter-crop spacing, and the agricultural action that is being guided by the output of the plant detection model. For example, the size of the mask and various zones and thresholds mentioned above can contract or expand, and the impact of the probability modification function, or the likelihood of reclassification can be increased or decreased. These factors can be adjusted based on the agricultural action. For example, if the agricultural action is the application of pesticide, the factors can be adjusted to favor preventing false positives and killing a crop as compared to preventing false negatives and missing a weed. The factors can also be adjusted based on the type of crop in the crop row or the type of planting used to plant the crop row. For example, in the case of transplant planting, more definite biasing can be applied as the average inter-crop spacing is likely to be very stable and accurate. In contrast, in the case of direct seeding with thinning, gentler bias can be applied as the average inter-crop spacing is likely to vary much more from one plant to the next. As another example, gentle biasing can be applied to crop rows having crops with randomized growth patterns such as broccoli while stronger biasing can be applied to crop rows having crops with regularized growth patterns such as romaine and iceberg lettuce.

In specific embodiments of the invention, additional inputs can be used to bias the plant detection model instead of, or in addition to, the average inter-crop spacing. For example, the plant detection model can be biased based on the spacing between rows, the speed of an associated vehicle's motion relative to the speed at which an associate agricultural task can be completed, the density of the soil, the ambient temperature, the soil temperature, the type of crops in the crop row, the type of planting used to plant the crop row, the height of the imager, the position of any actuators for the agricultural task in space, the growth stage of the crops, and various other factors.

The various biasing factors can all be measured by sensors of the system or input by a user. For example, the field planting information can either be input by a user or determined by the system as it begins to capture images of the crop row. For example, a classifier of the system could be trained to detect the characteristics of a transplanted field as compared to a direct seeding field and bias the plant detection model based on that information. In a similar approach, a classifier could be used to determine the crop types in the crop row and bias the plant detection model based on that information. In specific embodiments of the invention, a speed of the vehicle is used to bias the plant detection model. The speed can be determined using odometry data, positioning telemetry data, or a measurement of the movement of specific plants in a frame-to-frame analysis coupled with knowledge of the capture speed of the imager used to capture the frames. The determined speed can be used by the plant detection model in that it detects based on a targetable area of a weeder on the vehicle. For example, the system could determine that a vehicle was moving too fast for a precision weeder to be able to target a weed in a given location either at all or without damaging a nearby crop. Based on that determination, the system could decide to not target specific weeds.

Figure 6:
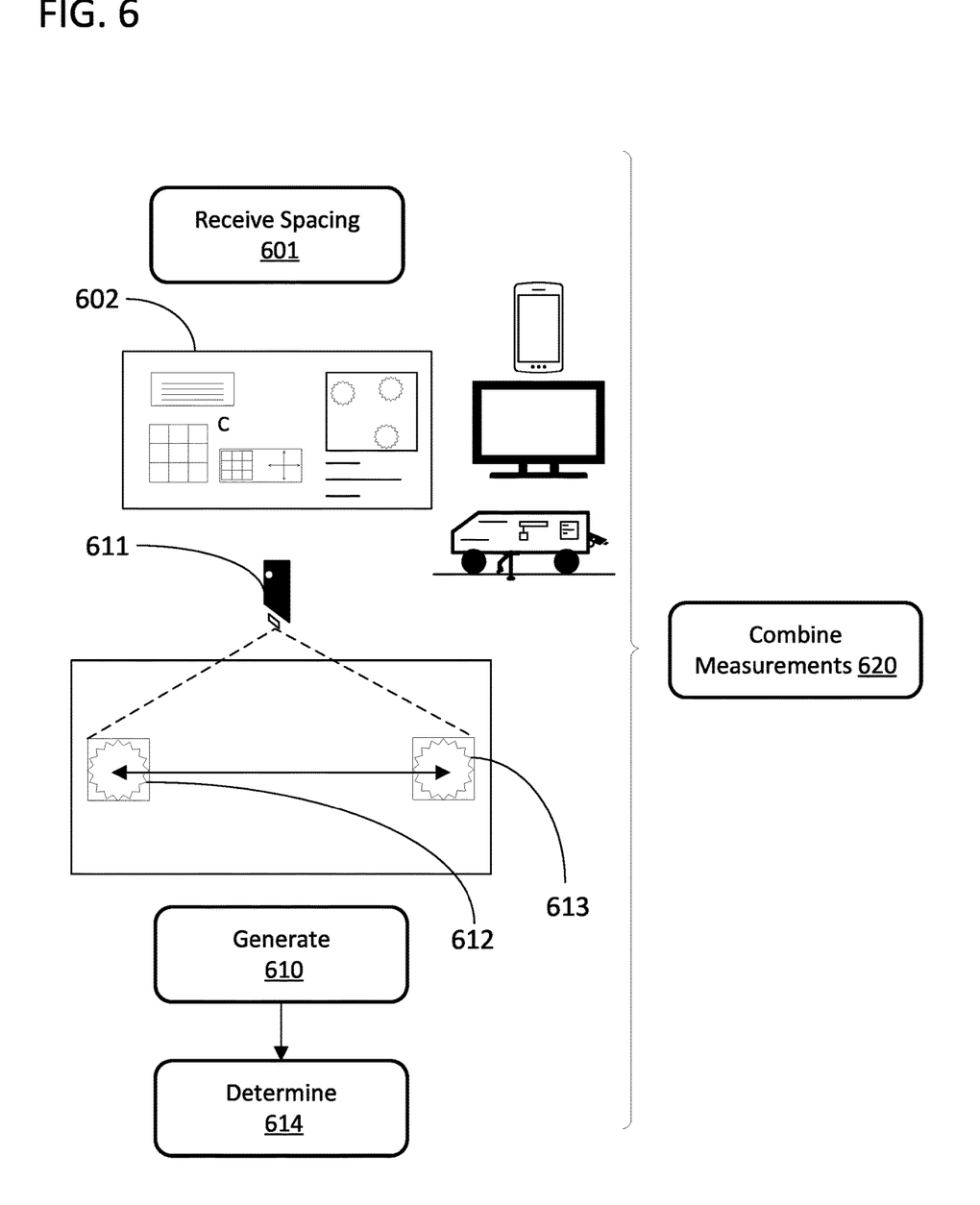
FIG. 6 illustrates a conceptual flow diagram and accompanying flow chart for a set of methods for obtaining an average inter-crop spacing in accordance with specific embodiments of the invention disclosed herein.

The average inter-crop spacing can be obtained in various ways depending upon the embodiment involved. In specific embodiments of the invention, the average inter-crop spacing can be input by a user into a user interface. FIG. 6 includes a conceptual block diagram and set of flow chart steps which includes step 601 of receiving the average inter-crop spacing via a user interface 602 for the vehicle. The user interface could be a microphone, keypad, touch screen or any other user interface. The user interface could be attached to a vehicle, or be part of a network connected separate device such as a personal computer or smart phone. The same user interface can be used to input the other sources of bias information mentioned above such as the crop type, number of lines per row, etc. This step can involve a user entering a simple numeric value into the system prior to allowing a vehicle to move down a crop row and begin capturing images of the row. Alternatively, or in combination, this can involve a user uploading precision planting information for a field of crops which can then be used to derive the average inter-crop spacing for various rows in the field. Field planting information such as this can also be used to derive the growth stage of the plants, the crop type, the row spacing, the number of lines in each row, the number of rows in the field, and other data which can be used as a bias for the plant detection model. Field planting information can be retrieved from a mechanical seeder for instance. Alternatively, field planting information may be entered manually by a user. In any case, field planting information can be used to derive an average inter-crop distance.

In specific embodiments of the invention, the average inter-crop spacing can be determined by the same system which is capturing images for controlling the agricultural task. If the plant detection model were already being used to identify crops, two sequential crops could be identified and the distance between them determined using various approaches including a direct analysis of the images such as via a SLAM analysis, via an understanding of the speed of the vehicle and the capture rate of the imager, or via the collection and analysis of telemetric data regarding the vehicle collected by sensors. This process can involve a step 610 of generating, using the plant detection model, a pair of outputs from the plant detection model. The image provided to the plant detection model could be an imager such as imager 611, and the outputs from the plant detection model could be a pair of locations for a first plant 612 and an adjacent second plant 613 in the crop row. The process can further involve a step 614 of determining a measured inter-crop spacing for the crop row using the pair of outputs. The average inter-crop spacing used by (e.g., used to bias) the plant detection model could then be based on the measured inter-crop spacing for the crop row. In specific embodiments of the invention, the system could repeatedly measure the inter-crop spacing and keep a table of inter-crop spacings as the imager moves along the crop row with the average inter-crop spacing be continuously calculated and adjusted. These embodiments could include continually executing, as the vehicle moves along the crop row, the generating 610 and determining 614 steps using a set of additional measured inter-crop spacings and a set of updated average inter-crop spacings.

In specific embodiments, the plant detection model could be designed to operate without using the average inter-crop spacing for the first one or more plants detected in a crop row and continue to do so until the average inter-crop spacing measured by the system began to stabilize. The system could be designed to operate with biases that guard against a higher degree of inaccuracies in the classifications during the preliminary phase in which the average is being calculated in order to avoid taking agricultural actions incorrectly.

In specific embodiments of the invention, both approaches could be combined such that the user input average inter-crop spacing and the system measured inter-crop spacing are both used in combination. For example, the user input average inter-crop spacing could be used in the preliminary phase, and the measured inter-crop spacing could be used after the measured average and the newly measured inter-crop spacing values began to converge. In these embodiments, instead of a sharp hand over from one value to the other, the measured value could be given progressively more weight and be used in combination with the user input value with the weight increasing as the measured values stabilized. Alternatively, or in combination, both the user input and measured values could be used to continually double check the other value throughout the traversal of the entire crop row with one value taking over if either value appeared to deviate too much from an expected variance in the inter-crop spacing. In these embodiments, any underlying confidence values which were used to identify the plants used in the measurement of the inter-crop spacing could be considered to determine how much weight to give the measured values relative to the user input values. These embodiments could include a combined measurement step 620 involving receiving an initial average inter-crop spacing via a user interface for a vehicle in an iteration of step 601, followed by generating, using the plant detection model and the initial average inter-crop spacing, a pair of outputs from the plant detection model in an iteration of step 610, and then followed by determining a measured inter-crop spacing for the crop row using the pair of outputs in an iteration of step 614. In these embodiments, the average inter-crop spacing for the crop row used by the plant detection model as in step 103 could be based on the measured inter-crop spacing for the crop row.

Flow chart 100 continues with a step 104 of outputting a control signal for a robotic action based on the output from the biased plant detection model and a step 105 of conducting the robotic action for the agricultural task in response to the control signal. The control signal will be based on the output in various ways. For example, the control signal could be generated because a weed or crop has been identified and the robotic action is directed towards that type of plant. As another example, the control signal will require the location of the plant as well as its classification. For example, if the control signal could be a control signal such as control signal 112 which includes (x, y) coordinates for a weed. This control signal could be based on the output of plant detection model in that the output of the plant detection model included the coordinates (x, y) or if could be based on the output of the plant detection model in that the plant detection model identified a plant as a weed, and a separate system tasked with generating the control signal determined the coordinates for that particular weed. Outputting the control signal can also include performing absolute or relative distance and alignment calculations between the location of the target of the action (e.g., a weed) and the agricultural implement that will execute the action (e.g., a precision weeder).

In specific embodiments, conducting the robotic action can take on various forms depending upon the agricultural task involved. For example, the robotic action could involve positioning an imager and capturing an image or it could involve conducting a precision weeding action. As illustrated in FIG. 1, the robotic action could be the precision weeding of a plant identified by bounding box 111 and leave behind tilled soil 113 after removing the weed. The robotic action can alternatively include performing crop thinning, precision weeding by disrupt soil in-between crops, cultivation by disrupting soil in between rows of crops, applying product on crops (fungicide, pesticide) to avoid waste (application on weed or ground is wasted), applying products only on weeds (avoid wasting chemicals, or damaging sensitive crops), evaluating crop health (quantity of water, chlorophyll in leaves) and nutrient needs, measuring the stage of growth (maturity stage) and estimate yield (size and weight of the crop), identifying diseases at early and late stages, monitoring the efficacy of weeding actions, evaluating the performance of weeding actions performance, and many others.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be memory within a personal user device or a network accessible memory. Although examples in the disclosure where generally directed to precision weeding, the same approaches could be utilized to any agricultural task. These and other modifications and variations to the present invention may be practiced by those skilled in the art, without departing from the scope of the present invention, which is more particularly set forth in the appended claims.

What is claimed is:

1. A method, performed by one or more processors, for controlling a robotic action for an agricultural task, in which the robotic action is conducted by an agricultural implement on a vehicle, comprising the steps of:
   receiving an initial average inter-crop spacing;
   generating, using a plant detection model and the initial average inter-crop spacing, a pair of outputs from the plant detection model;
   determining a measured inter-crop spacing for a crop row using the pair of outputs;
   receiving, using an imager moving along the crop row with the vehicle, at least one image of at least a portion of the crop row;
   using the at least one image, the plant detection model, and an average inter-crop spacing for the crop row to generate an output from the plant detection model, wherein the average inter-crop spacing for the crop row is based on the measured inter-crop spacing for the crop row;
   outputting a control signal for the robotic action based on the output from the plant detection model; and
   conducting the robotic action for the agricultural task in response to the control signal;
   wherein the plant detection model includes a neural network; and
   wherein the robotic action is one of precision harvesting of the crop row, precision weeding of an intercrop area of the crop row, precision watering on the crop row, precision thermal treatment of the intercrop area of the crop row, and precision chemical application on the crop row.

2. The method of claim 1, further comprising:
   receiving the initial average inter-crop spacing via a user interface for the vehicle.

3. The method of claim 1, further comprising:
   continually executing, as the vehicle moves along the crop row, the generating and determining steps using a set of additional measured inter-crop spacings and a set of updated average inter-crop spacings.

4. The method of claim 1, further comprising:
   determining a speed of the vehicle moving along the crop row;
   wherein the plant detection model uses the speed and detects based on a targetable area of a weeder on the vehicle.

5. The method of claim 1, wherein the at least one image includes at least one of:
- a three-dimensional image;
- a two-dimensional image;
- a stereoscopic image;
- a multispectral image;
- a color filtered visual spectrum image;
- a color filtered hyperspectral image; and
- a normalized difference vegetation index image.

6. The method of claim 1, wherein the plant detection model includes a color filter preprocessor.

7. The method of claim 1, wherein the output from the plant detection model includes:
- a location of a plant; and
- size information for the plant.

8. The method of claim 1, wherein using the average inter-crop spacing to generate the output for the plant detection model comprises:
applying a mask to the at least one image in an expected crop location, wherein the expected crop location is derived from the average inter-crop spacing for the crop row.

9. The method of claim 1, wherein using the average inter-crop spacing to generate the output for the plant detection model comprises:
applying a classification probability modification function to the output, wherein the classification probability modification function is derived from the average inter-crop spacing for the crop row.

10. The method of claim 1, wherein using the average inter-crop spacing to generate the output for the plant detection model comprises:
adding a reclassification function to a classifier of the plant detection model, wherein the reclassification function is derived from the average inter-crop spacing for the crop row.

11. The method of claim 10, wherein:
the reclassification function reclassifies a crop as a weed if a distance from a prior crop is within a culling threshold.

12. The method of claim 1, wherein:
an output of the plant detection model includes frame-to-frame plant tracking.

13. The method of claim 1, further comprising: moving the vehicle along the crop row.

14. A system for controlling a robotic action for an agricultural task comprising:
- a vehicle;
- an agricultural implement on the vehicle, wherein the robotic action is conducted by the agricultural implement;
- an imager;
- one or more processors; and
- one or more non-transitory computer-readable media storing instructions that, when executed by the one or more processors, cause the system to:
  - receive an initial average inter-crop spacing;
  - generate, using a plant detection model and the initial average inter-crop spacing, a pair of outputs from the plant detection model;
  - determine a measured inter-crop spacing for a crop row using the pair of outputs;
  - move the vehicle along the crop row;
  - receive, using the imager moving along the crop row with the vehicle, at least one image of at least a portion of the crop row;
  - using the at least one image, the plant detection model, and an average inter-crop spacing for the crop row to generate an output from the plant detection model, wherein the average inter-crop spacing for the crop row is based on the measured inter-crop spacing for the crop row;
  - output a control signal for the robotic action based on the output from the plant detection model; and
  - conduct the robotic action for the agricultural task in response to the control signal;
- wherein the plant detection model includes a neural network; and
- wherein the robotic action is one of precision harvesting of the crop row, precision weeding of an intercrop area of the crop row, precision watering on the crop row, precision thermal treatment of the intercrop area of the crop row, and precision chemical application on the crop row.

15. The system from claim 14,
- wherein a pose of the imager is registered in a frame of reference; and
- wherein the control signal for the robotic action is provided in the frame of reference.

16. One or more non-transitory computer-readable media storing instructions that, when executed by one or more processors, cause a system to execute a method for controlling a robotic action for an agricultural task, in which the robotic action is conducted by an agricultural implement on a vehicle comprising:
- receiving an initial average inter-crop spacing;
- generating, using a plant detection model and the initial average inter-crop spacing, a pair of outputs from the plant detection model;
- determining a measured inter-crop spacing for a crop row using the pair of outputs;
- receiving, using an imager moving along the crop row with the vehicle, at least one image of at least a portion of the crop row;
- using the at least one image, the plant detection model, and an average inter-crop spacing for the crop row to generate an output from the plant detection model, wherein the average inter-crop spacing for the crop row is based on the measured inter-crop spacing for the crop row;
- outputting a control signal for the robotic action based on the output from the plant detection model; and
- conducting the robotic action for the agricultural task in response to the control signal;
- wherein the plant detection model includes a neural network; and
- wherein the robotic action is one of precision harvesting of the crop row, precision weeding of an intercrop area of the crop row, precision watering on the crop row, precision thermal treatment of the intercrop area of the crop row, and precision chemical application on the crop row.

* * * * *